United States Patent
Haferbeck et al.

(10) Patent No.: US 6,314,302 B1
(45) Date of Patent: Nov. 6, 2001

(54) METHOD AND TELECOMMUNICATION SYSTEM FOR SUPPORTING MULTIMEDIA SERVICES VIA AN INTERFACE AND A CORRESPONDINGLY CONFIGURED SUBSCRIBER TERMINAL

(75) Inventors: Ralf Haferbeck, Unterschleissheim; Detlef Ernst, München, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/308,583

(22) PCT Filed: Nov. 14, 1997

(86) PCT No.: PCT/DE97/02679

§ 371 Date: May 20, 1999

§ 102(e) Date: May 20, 1999

(87) PCT Pub. No.: WO98/26592

PCT Pub. Date: Jun. 18, 1998

(30) Foreign Application Priority Data

Dec. 9, 1996 (DE) ............................................. 196 51 084

(51) Int. Cl.$^7$ ....................................................... H04B 1/38
(52) U.S. Cl. ......................... 455/550; 455/509; 455/566; 370/329; 348/14.01; 348/14.02
(58) Field of Search ................................ 455/179.1, 403, 455/414, 464, 38.4, 509, 515, 517, 566, 66, 67.7, 74; 348/14.01, 14.02; 370/329, 341, 343

(56) References Cited

U.S. PATENT DOCUMENTS 4,546,383 * 10/1985 Abramatic et al. ............... 348/14.15

5,414,444 * 5/1995 Britz ..................................... 345/156

(List continued on next page.)

FOREIGN PATENT DOCUMENTS

| 38 23 219 C1 | 5/1989 | (DE) . |
| 44 41 685 A1 | 6/1996 | (DE) . |
| 0 619 679 A1 | 10/1994 | (EP) . |

OTHER PUBLICATIONS

Tak–Shing Yum et al, "Video Bandwidth Allocation for Multimedia Teleconferences", IEEE Transactions on Communications, vol. 43, No. 2/04, Part 1, Feb. 1995, pp. 457–465.

(List continued on next page.)

*Primary Examiner*—William Trost
*Assistant Examiner*—Congvan Tran
(74) *Attorney, Agent, or Firm*—Schiff Hardin & Waite

(57) ABSTRACT

In the method, in the telecommunication system (UNW) N logical speech channels (e.g., S11, S12, S13) are used for the transmission of the speech signals of N subscribers, and only M (with M≦N) logical image channels (e.g., B11), which are selected previously, are used for the transmission of the image signals of M subscribers. The subscriber terminal device (MMS) outputs to the subscriber the speech signals, received via an interface (AI, CI), of the N subscribers, and displays to the subscriber the image signals, received from the transceive means, of the M subscribers. By the deliberate selection of an image channel (e.g., B11), or of several image channels, from a multiplicity of image channels, the transmission bandwidth required on the interface (in particular, a radio interface to mobile radio subscribers) for multimedia services can be constructed flexibly, and can be adapted to the existing transmission capacity of the interface. The telecommunication system is provided with apparatus for transmitting the provided speech signals of the N subscribers in N logical speech channels, as well as with apparatus (SFU) for the selection of the M (with M≦N) logical image channels, and with apparatus for transmitting the image signals of M subscribers in the M image channels.

18 Claims, 5 Drawing Sheets

U.S. PATENT DOCUMENTS

| | | |
|---|---|---|
| 5,473,363 | 12/1995 | Ng et al. . |
| 5,491,507 | 2/1996 | Umezawa et al. . |
| 5,574,966 * | 11/1996 | Barzegar et al. ................ 725/62 |
| 5,584,070 * | 12/1996 | Harris et al. ................ 455/346 |
| 5,590,127 * | 12/1996 | Bales et al. ................ 370/260 |
| 5,903,569 * | 5/1999 | Fujisaki ................ 370/472 |
| 5,970,418 * | 10/1999 | Budd et al. ................ 455/550 |
| 5,991,285 * | 11/1999 | Ghosh ................ 370/335 |
| 6,009,336 * | 12/1999 | Harris et al. ................ 455/566 |
| 6,085,112 * | 7/2000 | Kleinschmidt et al. ........ 455/556 |
| 6,144,647 * | 11/2000 | Lopez-Torres ................ 370/329 |
| 6,192,257 * | 2/2001 | Ray ................ 455/566 |

OTHER PUBLICATIONS

Carmine A, "Multimedia Over DECT: The Enabling Technology for Multi–Application Domestic Wireless Systems", Philips Telecommunication Review, vol. 52, No. 4, Oct. 1995, pp. 9–11.

Horiguchi, T. et al, "Picsend–C Realizes Low–Cost Simultaneous Conferencing at 5 Locations by TV Telephone", NTT Review, vol. 7, No. 5, Sep. 1995, pp. 84–88.

Mobile multimedia by MAVT—A starting point of many applications, RACE Mobile Telecommunications Summit, Lissabon 11, Bis 24.11, 4 pgs.

* cited by examiner

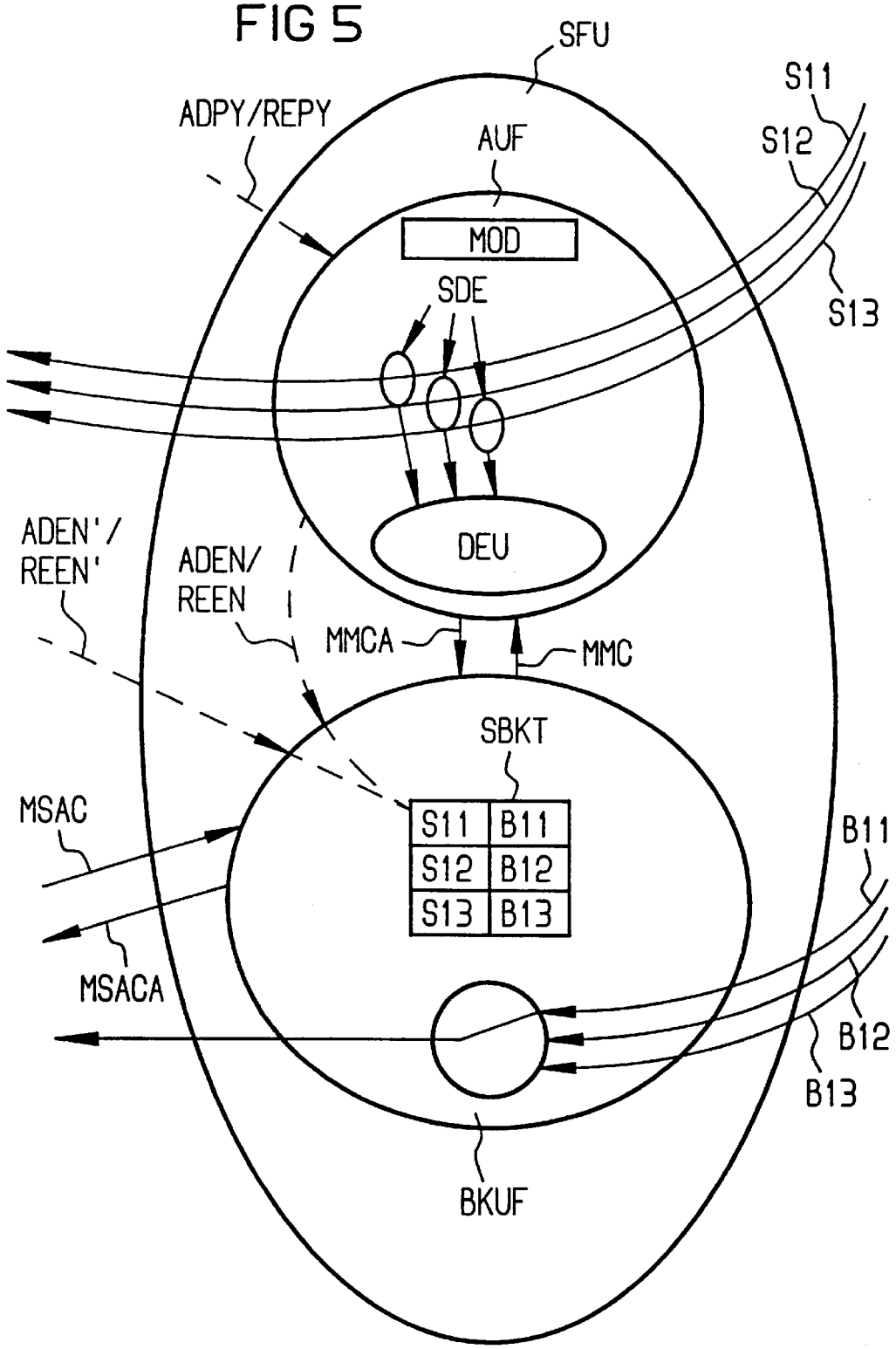

METHOD AND TELECOMMUNICATION SYSTEM FOR SUPPORTING MULTIMEDIA SERVICES VIA AN INTERFACE AND A CORRESPONDINGLY CONFIGURED SUBSCRIBER TERMINAL

BACKGROUND OF THE INVENTION

The invention relates to a method for supporting multimedia services via a radio interface between a mobile telecommunication system with radio-oriented transceiver apparatuses and a mobile terminal device with radio-oriented transceiver apparatuses, as well as a corresponding mobile telecommunication system and a corresponding mobile subscriber terminal device.

In telecommunication there is an increasing effort to enable universal personal telecommunication, which means that the services of a telecommunication system should be made available to a subscriber of such a system over as wide an area as possible. As a result, telecommunication systems with a radio interface or with a line-bound interface to subscriber terminal devices are subject to the demand of offering as many services as possible with suitable quality—also, in particular, for mobile subscribers via the air interface. Mobile communication systems comprise for example a radio interface to/from mobile stations of mobile radio subscribers, via which signaling signals and useful signals are transmitted. The signals are thereby produced at the transmit side and at the receive side, and are sent out by transceiver apparatuses of the telecommunication system or, respectively, of the mobile stations. For a supporting of multimedia services, such as for example video conferences, in telecommunication systems with radio interface there is the problem that the radio interface represents a bottleneck with respect to the transmission bandwidth. Its radio-oriented resources for signal transmission via air must thus be allocated very carefully and sparingly.

In addition, the mobile stations are relatively small and light, for which reason the possibilities for the display of images according to a multimedia service at the mobile terminal device are limited. For this reason, currently multimedia services are in any case offered in telecommunication networks with a line-bound interface, and up to now have not been supported by telecommunication systems with radio interface. Nonetheless, there already exist considerations relating to a prototype of a multimedia mobile terminal device—see "Mobile multimedia by MAVT—A starting point of many applications," distributed at the RACE Mobile Telecommunications Summit, Lisbon, 22–24 November 1995 (publication date on the last page 08/95).

From European reference EP-0 619 679 A1, an arrangement and a system are known for a multi-local teleconference with several subscribers who communicate with one another exclusively via wire-bound terminal devices in a line-bound telecommunication system (e.g. ISDN network). The essential step of the known teleconference is thereby that a speech localization unit detects the speech signals of several subscribers at various locations, and an image combination unit combines the image signals of the speaking subscribers to form a resulting image signal. This resulting image signal enables the simultaneous display of images of all speaking subscribers at particular zones of the display screen of each wire-bound terminal device involved in the conference.

From the article "The enabling technology for multi-application domestic wireless systems," PTR Philips Telecommunications Review 52 (1995) October, no. 4, pages 9 to 11, a DECT wireless system is known as a video conference system for "in-house" applications (domestic). The wireless system uses an air interface between a wireless base station and a wireless terminal device, but this is however not comparable with the radio interface of a mobile radio system with respect to the use and allocation of the radio-oriented resources for signal transmission. The wireless house videotelephone system has a limited range, whereby the DECT base station receives signals from the fixed network via a wire-bound videophone, and sends signals via the air interface to a television screen for the graphic display of the signals. This design can be used (e.g. as a DECT-based home security system) in situations in which videotelephones are not yet available.

SUMMARY OF THE INVENTION

The object of the invention is to indicate a method for supporting multimedia services via a radio interface, as well as a corresponding mobile telecommunication system and a corresponding mobile subscriber terminal device, by means of which the flexibility can be improved with respect to the transmission bandwidth in the use of multimedia services, with acceptable quality. In particular, the use of multimedia services via the air interface, which is critical with respect to the transmission bandwidth, is also to be enabled for the mobile radio subscribers of a mobile communication system.

Accordingly, in the inventive method, in the mobile telecommunication system N logical speech channels, with $N>=2$, are used for the transmission of the speech signals of N subscribers, and only M, with $M<N$, logical image channels, which are previously selected, are used for the transmission of the image signals of M subscribers. The mobile subscriber terminal device outputs to the subscriber the speech signals, received by the radio-oriented transceiver apparatuses, of the N subscribers, and displays to the subscriber the image signals, received by the transceiver apparatuses, of the M subscribers. In the simplest case $M=1$, which is also the most advantageous case with respect to the transmission bandwidth, it is thus necessary to select only one logical image channel for the transmission of the image signals of a single subscriber and to route this channel to the subscriber or, respectively, to the terminal device thereof via the interface, in addition to the N logical speech channels. In the case of application of a video conference, for example only the image of one subscriber is displayed at the mobile subscriber terminal device. In principle, the selection of several image channels ($M>1$) for the transmission of the image signals, and the display of the images of several subscribers of the multimedia service, is also possible. By means of the deliberate selection of one image channel or several image channels from a plurality of image channels, the transmission bandwidth required at the radio interface for the support of the multimedia services can be flexibly constructed and adapted to the existing transmission capacity of the interface. This has a particularly advantageous effect on the supporting of the multimedia service via a radio interface to/from the mobile subscriber terminal device of a radio subscriber, by which the multimedia service can thus be used despite the limited radio resources.

In mobile telecommunication systems, it has proven advantageous to select automatically the image channel that contains the image signals of the subscriber currently speaking. Alternatively to the automatic transmission and display of the image signals of the subscriber currently speaking, it is also advantageously possible to select an image channel for the transmission of the image signals of a particular subscriber or of a particular image segment, and to display the respective image signals, received via the radio interface, at the subscriber terminal device. For this purpose, the selection of the image segment, or of that subscriber whom the subscriber wishes to see at that moment, takes place via at least one user action initiated by the subscriber at the mobile subscriber terminal device.

For the activation of the user action, an actuation of one or more keys of an input means of the mobile subscriber terminal device or of a menu-type user interface of the subscriber terminal device takes place, in order to transmit the image of the desired subscriber in the image channel and to display it at the subscriber terminal device. For the selection of the image segment, the subscriber preferably uses an interactive input means of the subscriber terminal device, e.g. input controlling via a mouse.

For the exemplary case of application of the video conference as a multimedia service, the deliberate selection of one or more image channels in the mobile telecommunication system leads to gains in transmission capacity on the radio interface. The gain increases as the number of subscribers in the video conference increases, and has a correspondingly more advantageous effect in relation to the allocation of radio-oriented resources.

The mobile telecommunication system according to the invention is provided with means for transmitting the provided speech signals of N subscribers in N logical speech channels, with N>=2, as well as with means for selecting M, with M<N, logical image channels, and with means for transmitting the image Amended Page signals of M subscribers in the M image channels. The mobile telecommunication system thereby preferably comprises a function means with a selection function means for handling the logical speech channels, and an image channel changeover function means for image channel changeover. It is thereby advantageous if the selection function means sends a message to the image channel changeover function means, with which message the image signals of the subscriber currently speaking are switched through onto an outgoing logical image channel. According to an alternative development of the invention, a signaling signal is received by the selection function means or by the image channel changeover means, by means of which signal the image signals of a particular subscriber or of a particular image segment can be switched through onto an outgoing image channel.

It has proven particularly advantageous if the means for selecting the image channels are located in a radio-oriented subsystem or in a switching-oriented subsystem of a mobile telecommunication system connected, via a radio interface, with a mobile subscriber terminal device of a radio subscriber. As a switching means, a service controlling unit of a mobile telecommunication system that supports the structure of an intelligent network is particularly suitable.

The mobile subscriber terminal device according to the invention comprises means for the output of speech signals—respectively provided by the mobile telecommunication system and received in N logical speech channels, with N>=2—of N subscribers, as well as means for displaying image signals respectively provided by the mobile telecommunication system and transmitted in selected M, with M<N, logical image channels—of M subscribers.

It has proven advantageous to equip the device for the activation of a user action with one or more keys of an input means, or with a menu-type user interface for selecting an image channel that is provided in the mobile telecommunication system for the transmission of the image signals of a particular subscriber. Alternatively, for the activation of a user action it is likewise advantageous to equip the subscriber terminal device with an interactive input means for the selection of an image channel that is provided in the mobile telecommunication system for the transmission of the image signals of a particular image segment.

According to a particularly advantageous development of the invention, the subscriber terminal device, as a mobile device for the supporting of multimedia services for a radio subscriber, is provided with the above-named means via the radio interface.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which.

FIG. 5 shows, in a simplified view, the function means according to FIG. 3, given addition or, respectively, removal of a subscriber of the multimedia service.

DESCRIPTION OF THE PREFERRED EMBODIMENTS

Figure 1:
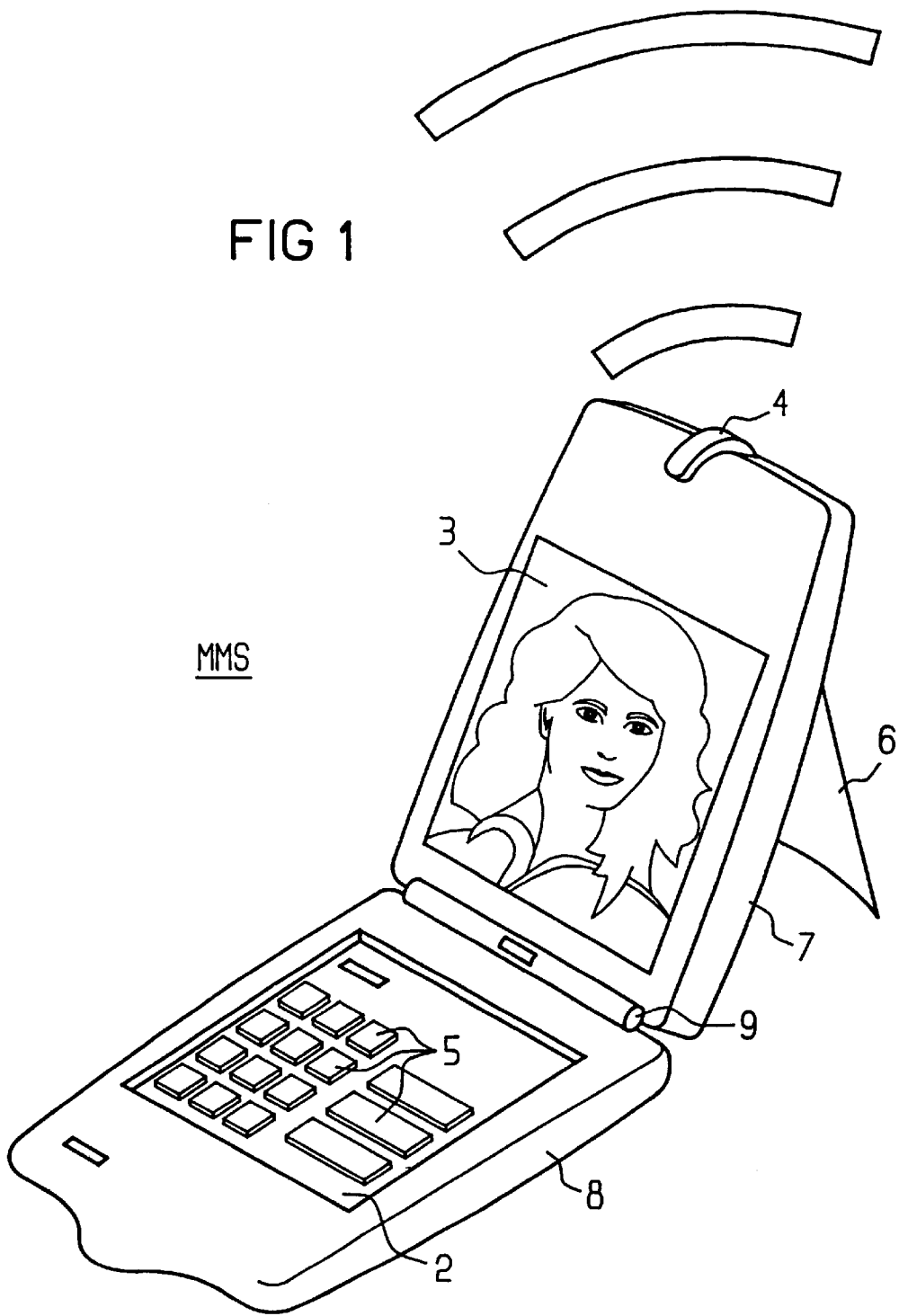
FIG. 1 shows a mobile subscriber terminal device for the support of a multimedia service, for the example of a video conference.

FIG. 1 shows a subscriber terminal device for the support of a multimedia service via an interface to/from a telecommunication system. In the present example, the multimedia service consists of a video conference with several subscribers of the telecommunication system, of which in the present example at least one subscriber is a mobile subscriber who can communicate, via a radio interface, with the telecommunication system. The mobile subscriber thus uses a mobile subscriber terminal device MMS for the video conference with the other subscribers. Likewise, wire-bound subscriber terminal devices are also used for multimedia services for subscribers connected to the telecommunication system via a line-bound interface. The subscriber terminal device MMS comprises a base element 8 and a movable element 7 that can be folded upward in relation to the base element 8. For the folding upward, the base element 8 and the movable element 7 are connected movably with one another, for example via a rotary hinge 9. The base element 8 comprises an input means 2 with keys 5 via which the subscriber can activate a user action. The keys 5 thereby comprise numeric keys that can for example be used for telephoning, and control keys that can for example be used for specific user inputs. Alternatively, instead of the input means 2 with keys 5, a menu-type user interface or an interactive input means, e.g. in the form of a mouse controlling, can be actuated by the mobile subscriber for the input of the user action. The movable element 7 of the subscriber terminal device comprises a display screen 3 for displaying an image that can be displayed by one of the other subscribers of the video conference after the transmission of corresponding image signals via the interface. The display screen 3 preferably comprises a resolution higher than that of the display field of a standard mobile station, in order to ensure a quality in the image representation that is acceptable for the user of the subscriber terminal device.

The speech signals received by the subscriber terminal device are outputted via a loudspeaker located in the base element 8. In order to enable displaying of the image of the mobile subscriber to the other subscribers of the telecommunication system, a video camera 4 is arranged at the upper end of the movable element 7 for the picking up of an image of the mobile subscriber. Transceiver means (not shown in more detail) are provided in the vicinity of the video camera 4, at the upper side of the movable element 7, which transceiver means enable the transmission and reception of speech signals and image signals via the radio interface. The speech signals of the mobile subscriber are picked up via a microphone that is located for example in the base element 8 of the subscriber terminal device 1. Instead of the mobile terminal device MMS, which resembles a mobile station, it is likewise possible to use another portable device, for example a notebook or a laptop with integrated transceiver means for the support of the radio interface, as a mobile terminal device that can be used by the mobile subscriber. For the case in which the subscriber terminal device is a wire-bound device, it is likewise provided with transceiver means for the support of the interface, with display means for the image signals and with output means for the speech signals.

Figure 2:
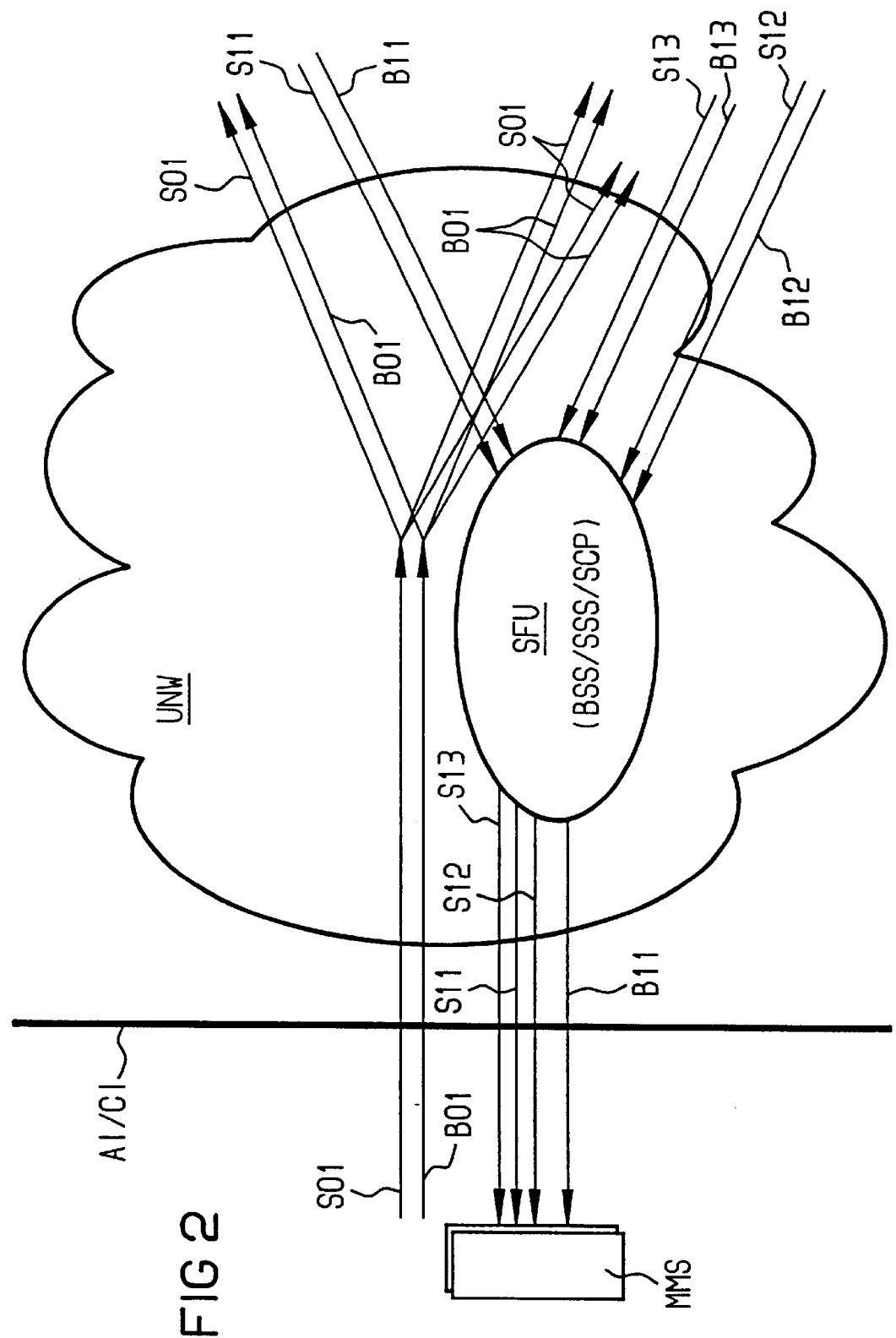
FIG. 2 shows a telecommunication system that is connected with the subscriber terminal device via a radio interface or a line-bound interface.

FIG. 2 shows, in a simplified view, a telecommunication system UNW that is connected, via a radio interface AI or a line-bound interface CI, with a subscriber terminal device, e.g. with the subscriber terminal device MMS shown in FIG. 1. Besides at least one mobile subscriber, other subscribers are also involved in the video conference, whose image signals and speech signals are picked up by the telecommunication system UNW or by another network connected to the telecommunication system UNW. For the present example, assume that the telecommunication system UNW consists of a universal mobile communication system (Universal Mobile Telecommunication Network) with at least one radio-oriented subsystem and one switching-oriented subsystem. However, the telecommunication system UNW can also be a line-bound network. The mobile communication system comprises for example interfaces to further networks such as the public telephone network (PSTN) or to the ISDN network or, respectively, to the broadband ISDN network or another mobile communication system (PLMN). Independent of the network or networks to which the other subscribers of the video conference are connected, the speech signals and image signals of the subscribers are either provided directly in the telecommunication system UNW or are transmitted directly to the telecommunication system UNW.

Due to the support of the radio interface AI, the telecommunication system UNW comprises at least one radio-oriented subsystem BSS that comprises for example one or more base stations, as well as at least one base station control unit connected with the base stations. The base station control units are respectively connected with the switching-oriented subsystem SSS, i.e. with one or more mobile switching centers, that take over the switching functions, including the mobile-radio-specific functions, in the connection handling, on the basis of particular services. As is known, the transceiver means of the radio-oriented subsystem BSS support signal transmission via the radio interface AI in both directions of transmission, from and to the subscriber terminal device MMS of a mobile radio subscriber. If the telecommunication system UNW is a line-bound network that supports the structure of an intelligent network, service control units SCP (Service Control Points) and service switching units (Service Switching Points) are provided.

In the present example, assume that a total of four subscribers, including a mobile subscriber with the subscriber terminal device MMS, are involved in the video conference. Speech signals and image signals are provided by the three remaining subscribers, by means of the telecommunication system UNW, and are transmitted for example in logical speech channels S11, S12 and S13, as well as in logical image channels B11, B12 and B13. The logical speech channels and image channels respectively contain the speech signals and image signals picked up for a subscriber of the multimedia service. The invention is thereby independent of the physical medium of transmission. Independent of its type, the telecommunication system UNW comprises a function means SFU that receives the speech signals, transmitted in the speech channels S11 . . . S13, and the image signals, transmitted in the image channels B11 . . . B13, of the N subscribers (here N=3). The function means SFU is for example located in the telephony processor of a base station control unit of the radio-oriented subsystem BSS or of a mobile switching center of the switching-oriented subsystem SSS in a mobile communication system or in a service control unit SCP in a line-bound network or in an ATM switching of a fixed network, in which the information can be transmitted according to the ATM (Asynchronous Transfer Mode) method.

From the number of N logical image channels, the function means SFU selects a number of M logical image channels, with M<=N, which instead of the N logical image channels are routed via the interface AI or CI to the subscriber terminal device MMS or, respectively, to the subscriber of the video conference. In the present example, the function means SFU selects from the N=3 incoming image channels B11 . . . B13 a single M=1 logical image channel B11, and switches it through to its output as an outgoing logical image channel. This has the result that at the subscriber terminal device MMS only the image signals of a single subscriber are received via the selected logical image channel B11 and displayed on the display screen. In this way, the transmission capacity, given the use of the multimedia service, has been reduced at the interface AI or CI, so that a maximally careful, advantageous and flexible allocation of the radio-oriented resources at the radio interface AI, or of the transmission resources at the line-bound interface CI, is achieved, even given the supporting of multimedia services, such as for example video conferencing. Besides the selected image channel B11, the function means SFU switches through the logical speech channels S11, S12 and S13 to its outputs, so that the speech signals, contained therein, of the N=3 subscribers involved in the video conference are transmitted via the interface AI or CI to the subscriber terminal device MMS of the subscriber, parallel to the image signals of the one subscriber.

The speech signals and the image signals of at least one subscriber are transmitted in the direction of transmission from the subscriber terminal device MMS to the telecommunication system UNW via the interface AI or CI. An image channel B01 thereby contains the respective image signals of the (e.g. mobile) subscriber, and a logical speech channel S01 contains the speech signals thereof. In the telecommunication system UNW, the incoming speech signals and image signals of the subscriber are forwarded to the other N=3 subscribers of the video conference in parallel, in the respective image channel B01 and in the respective speech channel S01. At the respective location of the N=3 other subscribers, the incoming speech signals of the mobile subscriber are outputted, and the incoming image signals of the mobile subscriber are displayed graphically. The advantageous of the presence of a function means SFU in the telecommunication system UNW consists in a gain in transmission capacity, in particular in the allocation of the scarce radio-oriented resources at the radio interface. In the present example, this is achieved in that instead of four logical image channels and four logical speech channels that have to be routed to/from the subscriber terminal device via the interface, only a single logical image channel is provided in addition to the three logical speech channels at the subscriber terminal device. In the case of more than four subscribers to a video conference, correspondingly higher gains in capacity, in relation to the standard method, are achieved on the interface, in particular the radio interface AI.

Figure 3:
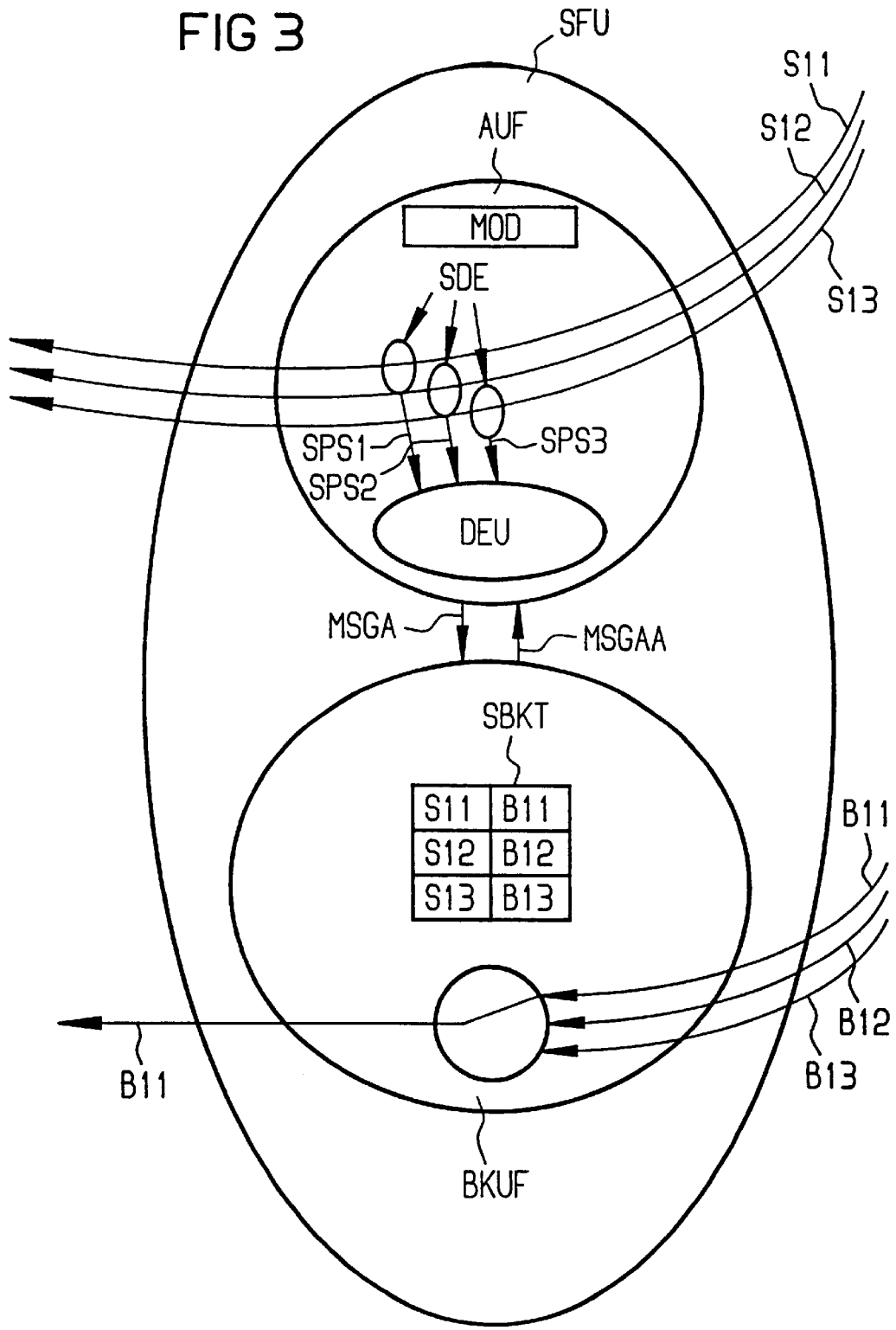
FIG. 3 shows, in a simplified view, a function means, arranged in the telecommunication system, for the selection of a logical image channel for image signal transmission via the interface.

FIG. 3 shows a simplified representation of the design of the structure of the function means SFU provided in the telecommunication system, which means is responsible for the selection of the image transmission. The function means SFU realizes a selection function and an image channel changeover function, of which the selection function in the selection function means AUF handles all the logical speech channels—in the present example the speech channels S11, S12 and S13—while the image channel changeover function in the image channel changeover function means BKUF handles all the logical image channels—in the present example, the image channels B11, B12 and B13. The selection function means AUF comprises several components, of which one component MOD indicates a current operating mode, in which either an image channel with the image signals of the currently speaking subscriber, or with the image signals of a particular subscriber or with the image signals of an image segment of an overall image of the video conference is automatically selected. A further component in the selection function means AUF are [sic] speech detectors SDE that are allocated to each of the logical speech channels S11 . . . S13, and that report whether the respective logical speech channel is active at that moment or not, i.e., whether a speech activity is registered on the logical speech channel or not. A final component in the selection function means AUF is a decision unit DEU, which provides the image channel changeover function means BKUF with an item of information concerning the currently active logical speech channel.

In the example shown, the image channel changeover function means BKUF contains an allocation table SBKT in which the entries contain an allocation of the logical speech channels to logical image channels and vice versa. A first entry thereby consists of items of information relating to the logical speech channel S11 and to the associated logical image channel B11, while a second entry consists of items of information relating to the logical speech channel S12 and the associated logical image channel B12, and a third entry consists of items of information relating to the logical speech channel S13 and the associated logical image channel B13. Likewise, the use of the allocation table SBKT in the selection function means AUF is possible, which correspondingly informs the image channel changeover function means BKUF about its entries.

For the above-indicated first case, in which the image channel that contains the image signals of the currently speaking subscriber is to be selected automatically, each of the speech detectors SDE checks the state of its allocated logical speech channel S11, S12, S13, and reports to the decision unit DEU as to whether the respective logical speech channel is active at that moment or not. The decision unit DEU is informed as to whether a speech activity is determined on the respective speech channel on the basis of information received in control signals SPS1, SPS2 and SPS3 by the respective speech detectors SDE. From the incoming information, the decision unit DEU determines whether or not an image channel changeover is required. Thus, for example, the image channel that transmits the image signals of the currently speaking subscriber is selected and is guided to the subscriber terminal device via the interface, in order to display the image thereof to the mobile subscriber. If several of the other subscribers are speaking at the same time, the image transmission is advantageously not modified, in order to avoid excessively frequent switching back and forth between different image channels.

If the speech detectors SDE identify a recently active speech channel as inactive, and another speech channel is reported as active, the decision unit DEU initiates an image channel changeover. For this purpose, the decision unit DEU uses a message MSGA in which an item of information concerning the new active speech channel is sent to the image channel changeover function means BKUF. In the opposite direction, the image channel changeover function means BKUF signals to the decision unit DEU, in a message MSGAA, whether or not the desired image channel changeover was able to be executed successfully. The image channel changeover is realized in that N incoming logical image channels are switched through onto M (with M<=N) outgoing image channels. Since the message MSGA contains an item of information to the effect that a speech activity was determined on the speech channel S11, in the present example a single logical image channel, e.g. B11, of the incoming logical image channels B11, B12 and B13, is switched through as a reaction to the incoming message MSGA. With the aid of the allocation table SBKT, the image channel B11 that belongs in the entry is determined, on the basis of the incoming information of the active speech channel S11, for the image transmission via the radio interface.

Figure 4:
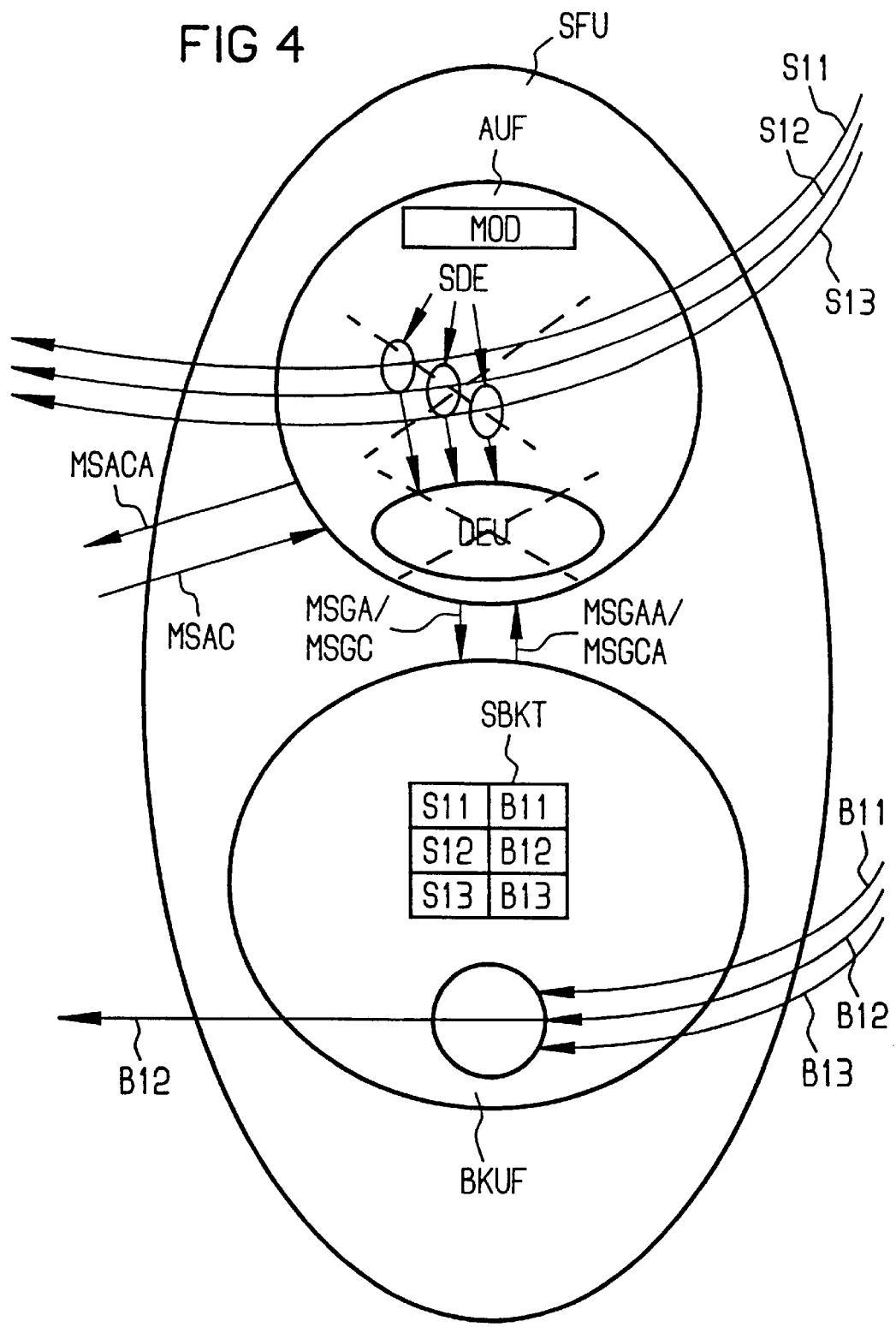
FIG. 4 shows, in a simplified view, the function means according to FIG. 3, for the selection of the logical image channel, dependent on a user action carried out via the subscriber terminal device.

FIG. 4 shows, in a simplified representation, the function means SFU, in which a user action for the selection of an image channel, initiated by the subscriber at the subscriber terminal device, is received from the selection function means AUF. This is for example the case if the subscriber selects, by means of activation of the control keys of the input means or by means of a combination of specific keys, or, respectively, by actuation of the menu-type user interface of the subscriber terminal device, the image of a particular subscriber that he would like to have currently displayed. The component MOD of the selection function means AUF thereby changes into an operating mode that appears as a user-controlled mode. The speech detectors SDE and the decision unit DEU can thereby both be switched off, which can be seen in FIG. 4 at the stricken-through components SDE and DEU. On the basis of the user action carried out by the subscriber, the subscriber terminal device produces a signaling signal MSAC that is transmitted to the telecommunication system via the interface, and is received in the function means SFU by the selection function AUF. The selection function means AUF thereupon sends the message MSGA, with an item of information relating to the logical speech channel in which the speech signals of the desired subscriber are contained, to the image channel changeover function means BKUF.

By means of the indication of the logical speech channel, the image channel function means BKUF obtains an item of information as to which other subscribers the subscriber would like to have displayed at his subscriber terminal device at that moment, in that the allocation table SBKT, with the corresponding associated logical image channel, is used for the selection. Let it thereby be assumed that the logical image channel B12, with the image signals of the desired subscriber, are switched through according to the image channel changeover function, and are sent, together with the associated speech channel S12, to the (e.g. mobile) subscriber via the radio interface. The image channel changeover function means BKUF thereupon sends the message MSGAA, in which the desired image channel changeover is identified as successfully executed, back to the selection function means AUF. The selection function means AUF thereupon informs the subscriber, by means of the signaling signal MSACA that is sent back to the subscriber terminal device via the radio interface, that his initiated user action was successfully executed. For the case in which an image channel changeover could not be executed, the message MSGAA, or, respectively, the signaling signal MSACA, can also contain an error message, or, respectively, an item of information for the identification of an unsuccessful attempt at the image channel changeover.

On the basis of the signaling signal MSAC, incoming in the telecommunication system, there is also the possibility of the selection of an image segment of the overall image of the video conference by the function means SFU, using a user action initiated by the subscriber. As in the case described previously, there first takes place a change of operating mode by means of the modification of the component MOD into an operating state in which the selection function means AUF communicates another message MSGC to the image channel changeover function means BKUF. The message MSGC contains an item of information concerning the image segment. The image channel changeover function means BKUF switches the desired image channel through at its output, and sends a message MSGCA back to the selection function means AUF, in which it is indicated whether the desired image channel changeover was able to be executed successfully or not. With the signaling signal MSACA, the selection of the function means AUF informs the mobile subscriber that his desired user action, i.e., the selection of a particular image segment, was able to be executed successfully, or not.

FIG. 5 shows, likewise in a simplified representation, the function means SFU, in which, on the basis of the user action initiated by the mobile subscriber, the signaling signals MSAC and MSACA are received directly, via the interface, from the image channel function means BKUF, or, respectively, are sent back. If a change of operating mode is thereby to be carried out with the user action, the image channel changeover function means BKUF sends out a message MMC to the selection function means AUF for the change of the operating mode, which function means AUF sends back a message MMCA for confirmation [sic: confirmation] of whether or not the change of operating mode was executed successfully. As already described above, the change of operating mode is achieved by modification of the component MOD according to the selection function. In response to all other user actions, the image channel changeover function means BKUF sends the image signals required for the new image segment through on the selected logical image channel, in order to be transmitted, via the interface, to the subscriber terminal device or, respectively, to the subscriber. In relation to the signaling caused by one or more user actions, a procedure has proven particularly effective in which the message relating to a change of operating mode is sent directly to the selection function means AUF, while the messages relating to all other user actions are communicated directly to the image channel changeover function means BKUF.

During a video conference, there is in addition the possibility of adding new subscribers or, respectively, of omitting previous subscribers from the video conference. The selection function or, respectively, the image channel changeover function in the function means SFU is thereby integrated into the standard signaling that is used for the connection handling given outgoing and incoming calls. A message ADPY for the addition of a subscriber or, respectively, a message REPY for the omission of a subscriber is received by the selection function means AUF, which thereupon effects, by means of the message ADEN or, respectively, REEN, an updating of the allocation table SBKT arranged in the image channel changeover function means BKUF.

The updating of the allocation table SBKT consists in an addition of an entry, consisting of information relating to the new speech channel and the new image channel, or, respectively, of the erasing of an existing entry consisting of information relating to a previous speech channel and the corresponding image channel. The incoming or, respectively, outgoing speech channels and image channels in the function means SFU are correspondingly updated during the connection setup or, respectively, connection teardown. Alternatively, messages ADEN' or, respectively, REEN', for the addition of a subscriber or, respectively, erasing of a subscriber, can be sent directly to the image channel changeover function means BKUF, which thereupon adapts its allocation table SBKT correspondingly. The incoming or, respectively, outgoing speech channels and image channels in the function means SFU are likewise correspondingly updated during the connection setup or, respectively, connection teardown.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for supporting multimedia services via a radio interface between a mobile telecommunication system with a radio-oriented transceiver and a mobile subscriber terminal device with a radio-oriented transceiver, comprising the steps of:

providing speech signals and image signals of subscribers of a multimedia service at a transmit side and at a receive side, and sending the speech signals and image signals by the respective transceivers via the interface;

using in the mobile telecommunication system, N logical speech channels, where N>2, for transmission of the speech signals, provided by the mobile telecommunication system, of N subscribers, and using M logical image channels, where M<N, which are selected in the mobile telecommunication system, for transmission of the image signals of M subscribers;

determining a currently speaking subscriber with speech detectors that are allocated to the N logical speech channels that check a speech channel state to determine whether this speech channel is already active when there is speech activity or whether this speech channel is inactive when there are pauses in the speech activity;

automatically selecting, in the telecommunication system, an image channel that contains image signals of the currently speaking subscriber; and outputting via the subscriber terminal device the speech signals, received by the respective transceiver, of the N subscribers, and displaying the image signals, received by the respective transceiver, of the M subscribers.

2. The method according to claim 1, wherein given simultaneous speaking of other subscribers, the automatically selected image signal is maintained.

3. The method according to claim 1, wherein items of information relating to the state of the speech channels are made available by the speech detectors and are sent to a decision unit that produces a message for image channel changeover, dependent on the information received by the detectors.

4. The method according to claim 3, wherein if the decision unit has reported a recently active speech channel as inactive and another speech channel as active, the message for the image channel changeover is produced by the decision unit, with an item of information relating to a new speech channel.

5. The method according to claim 1, wherein by at least one user action executed by the subscriber at the mobile subscriber terminal device, the mobile telecommunication system is signaled to select an image channel for transmission of image signals of a particular subscriber or of a particular image segment, and wherein the image signals, received via the interface, of the particular subscriber or of the particular image segment are displayed at the mobile subscriber terminal device.

6. The method according to claim 5, wherein for initiation of the user action, at least one key of an input device of the mobile subscriber terminal device, or a menu-type user interface of the mobile subscriber terminal device, are actuated by the subscriber.

7. The method according to claim 5, wherein for initiation of the user action, an interactive input device of the mobile subscriber terminal device is used by the subscriber for selection of the image segment.

8. The method according to claim 1, wherein in the mobile telecommunication system a selection function is carried out for handling of the logical speech channels and for identification of at least two operating modes that relate to the selection of the image channels, with image signals of one of a currently speaking subscriber, a particular subscriber or a particular image segment.

9. The method according to claim 8, wherein the selection function is executed using an allocation table in which the logical speech channels are allocated to the logical image channels.

10. The method according to claim 9, wherein if, during call handling of the multimedia service in the mobile telecommunication system, a signaling indicates that a new subscriber is added or a previous subscriber is omitted, the allocation table is respectively adapted by addition of a new entry or by erasing of a previous entry.

11. The method according to claim 1, wherein in the mobile telecommunication system an image channel changeover function is used for respective switching through of one of a plurality incoming image channels in the telecommunication system onto an outgoing image channel.

12. The method according to claim 10, wherein the image channel changeover function is executed using an allocation table in which the logical speech channels are allocated to the logical image channels.

13. The method according to claim 12, wherein if, during call handling of the multimedia service in the mobile telecommunication system, a signaling indicates that a new subscriber is added or a previous subscriber is omitted, the allocation table is respectively adapted by addition of a new entry or by erasing of a previous entry.

14. A mobile telecommunication system with radio-oriented transceivers for support of multimedia services via a radio interface from/to a mobile subscriber terminal apparatus with radio-oriented transceivers, comprising:

apparatuses for providing speech signals and image signals of subscribers of the multimedia service that are sent out by the transceivers via the radio interface;

apparatuses for sending the provided speech signals of N subscribers in N logical speech channels, where N>2, and apparatuses for selecting M, M<N, logical image channels, and apparatuses for sending the image signals of M subscribers in the M image channels; and;

a function device for selection of the image channels having a selection function device for handling the logical speech channels and having an image channel changeover function device for the image channel changeover, wherein the selection function device sends a message to the image channel changeover function device with which the image signals of a currently speaking subscriber are switchable through onto an outgoing logical image channel.

15. The mobile telecommunication system according to claim 14:

wherein, based on at least one user action executed by a subscriber at the mobile subscriber terminal device, the selection function device or the image channel changeover function device receive a signaling signal by which the image signals of a particular subscriber or of a particular image segment are switchable through an outgoing image channel.

16. The mobile telecommunication system according to claim 14, wherein the device for selecting the image channels are arranged in a radio-oriented subsystem of a mobile telecommunication system that is connected, via the radio interface, with a mobile subscriber terminal device of a radio subscriber.

17. The mobile telecommunication system according to claim 14, wherein the apparatuses for selecting the image channels are arranged in a switching-oriented subsystem of a mobile telecommunication system that is connected via the radio interface with the mobile subscriber terminal device of a radio subscriber.

18. The mobile telecommunication system according to claim 17, wherein the switching-oriented subsystem is a service control unit of a mobile telecommunication system that supports a structure of an intelligent network.

* * * * *